Aug. 15, 1950  E. F. ALLBERT ET AL  2,519,213
MOTOR CONTROL SYSTEM
Filed Feb. 21, 1947
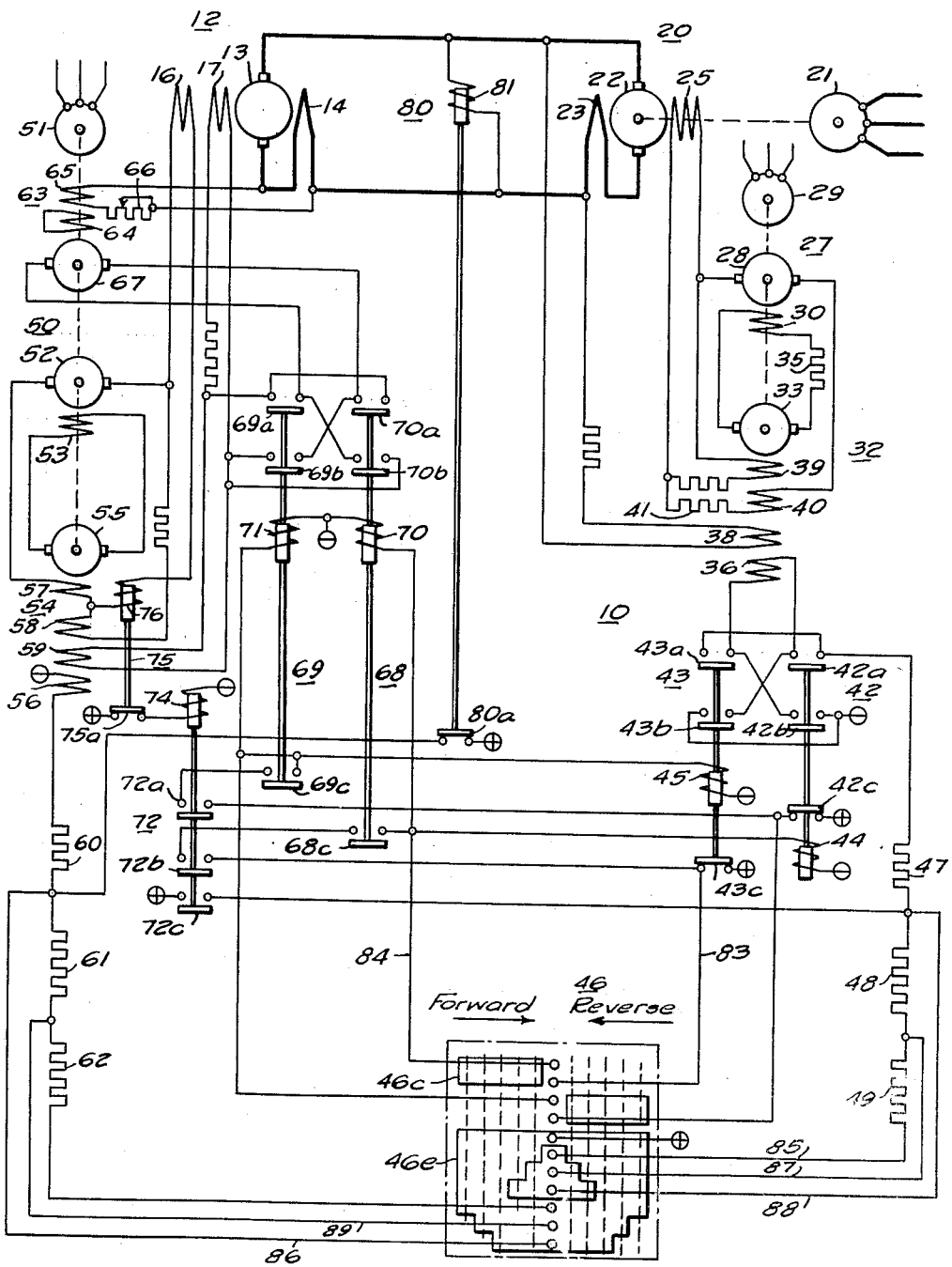
WITNESSES:
INVENTORS
Eugene F. Allbert and
Martin H. Fisher
BY
G. M. Crawford
ATTORNEY Patented Aug. 15, 1950

2,519,213

UNITED STATES PATENT OFFICE 2,519,213

MOTOR CONTROL SYSTEM

Eugene F. Allbert, Turtle Creek, and Martin H. Fisher, Pittsburgh, Pa., assignors to Westinghouse Electric Corporation, East Pittsburgh, Pa., a corporation of Pennsylvania Application February 21, 1947, Serial No. 729,940

9 Claims. (Cl. 318—144)

Our invention relates, generally, to control systems, and it has reference, in particular, to systems for controlling the operation of large reversing motors such as are used for driving reversing mills and the like.

Generally stated, it is an object of our invention to provide a control system for reversing motors, which is simple and inexpensive to manufacture, and which is reliable and efficient in operation.

More specifically, it is an object of our invention to provide for limiting the armature current of a motor by varying the field excitation thereof.

It is also an object of our invention to provide for reducing peaks in the armature current of a motor driving a reversing mill by using a control generator of the saturable shunt type for increasing the field excitation of the motor when the armature current thereof reaches a predetermined value.

Another object of our invention is to provide for using main and/or auxiliary field windings on a reversing motor, and to provide for limiting current peaks in the armature circuit by rapidly increasing the energization of the main and/or auxiliary field winding, if the armature current increases above a predetermined value.

Yet another object of our invention is to provide for limiting the armature current and improving the stability of operation of a reversing motor in a variable voltage control system, by maintaining the voltage of the generator supplying power to the motor at a relatively high value until the field excitation of the motor has increased a sufficient amount to permit the maximum rate of transfer of energy from the motor to the generator on regeneration.

It is also an object of our invention to provide, in a variable voltage motor control system, for preventing a reduction of the field excitation of the motor unless the voltage of the generator reaches a predetermined value.

Other objects will in part be obvious, and will, in part, be described hereinafter.

In practicing our invention in one of its forms, the motor driving the roll stand of a reversing mill, or the like, is provided with an armature and main and auxiliary field windings. The armature is energized from a main generator whose output voltage is controlled by a regulating generator having a pattern field winding which is reversibly and variably energizable under the control of a master switch. A current limit generator of the saturable shunt, quick-response type is used to energize the auxiliary field winding of the motor to a predetermined level immediately upon an increase of the armature current above a predetermined value. The main field winding is energized through a regulating generator which is controlled by a master switch and the current limit generator. This main field will be most effective where the increase in armature current reaches substantial proportions. The armature current is further limited by means of a relay responsive to increase of the motor field current, which prevents too sudden a reduction in the generator voltage when the motor is reversed from a relatively high speed in either direction.

For a more complete understanding of the nature and scope of our invention, reference may be made to the following detailed description, which may be read in connection with the accompanying drawing in which the single figure of the drawing is a diagrammatic view of a motor control system embodying the invention in one of its forms.

Referring to the drawing, the reference numeral 10 may denote generally a control system for a reversing motor 12, which may be connected in driving relation with a load such as a universal reversing roll stand (not shown), or the like. The motor 12 may comprise an armature 13 having a compensating winding 14 connected in series circuit relation therewith, and main and auxiliary field windings 16 and 17, respectively.

The armature 13 may be energized from a suitable source of variable voltage power such as a main generator 20 driven by a motor 21. The generator may comprise an armature 22, a compensating field winding 23, and a main field winding 25. The armature 22 and compensating field winding may be connected in series circuit relation with the armature 13 and compensating field winding 14 of the motor. The main field winding 25 which has sufficient capacity to "force" or rapidly increase the excitation of the main generator may be energized by a control generator 27. The control generator 27 may be provided with an armature 28 having a driving connection with a motor 29, and a field winding 30.

The output voltage of the main generator 20 may be controlled by a regulating generator 32 for controlling the energization of the field winding 30 of the control generator 27. The generator 32 may comprise an armature 33 connected in circuit relation with the field winding 30 through a control resistor 35, and a plurality of field windings including a pattern field winding 36, a differential field winding 38, an anti-hunt field winding 39, and a self-energizing field winding 40.

The self-energizing field winding 40 may be connected in series circuit relation with the armature 28 of the control generator, a control resistor 41, and the field winding 25 of the main generator, so as to provide a predetermined magnetomotive force in excess of that required to compensate for the air gap losses of the regulating generator.

The anti-hunt field winding 39 may be so connected in shunt circuit relation with the field winding 25 of the main generator, as to normally neutralize the excess magnetomotive force produced by the self-energizing field winding 40 over that required to compensate for the air gap magnetomotive losses of the regulating generator 32.

The pattern field winding 36 may be connected to a suitable source of control voltage through reversing means, such as the "forward" and "reverse" control relays 42 and 43, which may have operating windings 44 and 45, respectively, which are energized in accordance with the operating position of a master switch 46, which may be of the drum type. Control resistors 47, 48 and 49 may be connected in circuit with the winding 36, resistors 48 and 49 being sequentially shunted by the control switch to vary the energization of the winding.

The differential field winding 38 which opposes the pattern field winding 36, may be energized in accordance with the output voltage of the main generator 20, being, for example, connected across the armature 22 and the compensating field winding 23.

The main field winding 16 of the main motor 12 may be energized from a motor control generator 50 driven by a motor 51 and having an armature 52 and a field winding 53. The generator 50 should also have sufficient capacity to "force" or rapidly increase the energization of the motor field winding. The output voltage of the control generator 50 may be controlled by means of a motor regulating generator 54 having an armature 55, a pattern field winding 56, a differential field winding 57, an anti-hunt field winding 58, and a current limit field winding 59.

The pattern field winding 56 may be connected to a suitable source of control voltage through control resistors 60, 61 and 62, the latter two of which may be sequentially shunted through operation of the master switch 46 to vary the energization of the winding. The differential field winding 57 may be connected in series circuit relation with the armature 52 and the main field winding 16 of the main motor 12, so as to be responsive to the energization of the main field winding. The anti-hunt field winding 58 may be so connected in shunt circuit relation with the main field winding 16 of the motor 12 as to oppose any differential between the magnetomotive forces of the pattern and differential field windings.

In order to provide for reducing the peak values of armature current of the main motor which may be encountered during heavy motoring loads, or during regeneration when the motor is reversed, means such as the current limit generator 63 may be provided. The current limit generator 63 may be of the saturable shunt type, such as is described in the Patent No. 2,383,971 to J. G. Ivy. This type of generator has a magnetic shunt in the field structure which is provided with close-circuited turns represented by the field winding 64.

The main field winding 65 of the current limit generator 63 may be energized in accordance with the armature current of the main motor 12 being, for example, connected across the compensating field winding 14 in circuit relation with an adjustable rheostat 66. The characteristics of this generator are such that its output voltage remains at substantially zero value until the armature current of the main motor 12, reaches a predetermined value, whereupon the output voltage of the current limit generator rises rapidly. The field 64 causes the current limit generator to have an anticipatory effect on sudden changes in load. The armature 67 of the current limit generator 63 may be connected through switch means, such as the auxiliary "forward" and "reverse" relays 68 and 69 to energize the current limit field windings 17 of the main motor 12, and 59 of the motor regulating generator 54. The relays 68 and 69 may be provided with operating windings 70 and 71 which are selectively energized in response to the operating position of the master switch 46. Auxiliary contact members 68a and 69c provide interlocking circuits for the forward and reverse relays 42 and 43.

In order to further reduce the peak values of the armature current of the main motor 12, control means, such as the control switch 72, may be provided for shunting the control resistors 48 and 49 in the energizing circuit of the pattern field winding 36 of the regulating generator 32 whenever the master switch 46 is operated to reverse the main motor 12 while it is running at a relatively high speed. This maintains the voltage applied to the armature 13 of the main motor 12 until the energization of the main field winding 16 reaches a relatively high value. This result may be accomplished by providing an energizing circuit for the operating winding 74 of the control switch 72, through the back contacts 75a of a current responsive relay 75, having an operating winding 76 connected in circuit with the main field winding 16 of the motor 12. The current relay 75 may be disposed to operate when the energization of the main field winding 16 reaches some predetermined value of approximately 80%, for example, of the full field value.

For the purpose of further preventing sudden peaks of armature current of the main motor 12 because of a weakening of the main motor field when the master switch 46 is thrown to the reverse position rapidly, means may be provided for preventing weakening of the motor field unless the voltage of the generator 20 is above a predetermined value. For example, means, such as the voltage relay 80, may be provided, having an operating winding 81 connected across the armature 22 of the main generator 20. A circuit may be provided through back contacts 80a of the voltage relay 80, so as to shunt the control resistors 61 and 62 to maintain the energization of the pattern field winding 56 of the motor regulating generator 54 at a relatively high value, whereby the energization of the main field winding 16 of the motor 12 is maintained at a relatively high value so long as the voltage of the main generator 20 is below a predetermined value.

When voltage is applied to the system, the pattern field winding 56 of the motor regulating generator 54 is energized at the full field value, but the pattern field winding 36 of the generator regulating generator 32 remains deenergized since neither of the relays 42 or 43 is energized. If the master switch 46 is moved in the "forward"

direction, the "forward" relays 42 and 68 will operate, since their operating windings will be energized through circuits extending from positive through contact members 43c of "reverse" relay 43, conductor 83, segment 46c and conductor 84 to the windings 44 and 70. The pattern field winding 36 is thereupon energized through contact members 42a and 42b.

The energization of the pattern field winding 36, which controls the voltage that the main generator 20 applies to the armature of the main motor 12, is determined by the operating position of the master switch 46. In a like manner, the energization of the field winding 16 of the main motor 12 will be determined by the energization of the pattern field 56 of the motor regulating generator. The current limit field windings 17 and 59 of the main motor 12 and motor regulating generator 54, respectively, are connected to the armature 67 of the current limit generator 63 through contact members 70a and 70b of the auxiliary forward relay 68. The pattern field winding 36 is first connected to the source with the control resistors 47, 48 and 49 in series circuit relation therewith through a circuit extending from positive through segment 46e, conductor 85, resistors 49, 48 and 47, contact members 42a, field winding 36, and contact members 42b to negative. The pattern field winding 56 is connected to the source with the control resistors 60 and 61 shunted from the circuit, through a circuit extending from positive through segment 46e, conductor 86, resistor 60, and pattern field winding 56 to negative.

As the master switch 46 is moved in the forward direction, the resistors 49 and 48 are sequentially shunted from the circuit of the pattern field winding 36 through segment 46e and conductors 87 and 88, respectively, so as to increase the output voltage of the main generator 20. Further movement of the master switch in the "forward" direction causes the shunt circuits to be removed from the control resistors 61 and 62 by the disconnection of conductors 86 and 89 from the segment 46e, so as to reduce the energization of the pattern field winding 56, and decrease the energization of the field winding 16 of the main motor to further increase its speed.

During normal operation the output voltage of the current limit generator 63 remains at substantially zero. Should the load on the main motor 12 increase beyond a predetermined amount for which the resistor 66 is adjusted, the energization of the field winding 65 will reach a value sufficient to produce an output voltage in the circuit of the armature 67. During motoring this output voltage will be in such a direction as to increase the output voltage of the regulating generator 54, and to make the auxiliary field winding 17 cumulative with respect to the main field winding 16. Since the current limit generator 63 energizes the auxiliary motor field winding 17 directly, a minimum of apparatus is involved, and its effect will be felt immediately and the armature current of the main motor will be limited with a minimum of delay. Should the load increase be of any appreciable duration, the current limit field winding 59 of the regulating generator which operates on the motor field winding indirectly and hence requires a longer time for its effects to be felt, will take hold. The energizations of the main field winding 16 and/or the auxiliary field winding 17 will thereupon be increased sufficiently to limit the armature current of the main motor 12 to the predetermined maximum value.

Should the master switch 46 be moved quickly in the reverse direction, the control resistors 61 and 62 will first be shunted in that order, to increase the excitation of the main field winding 16, and the shunts will then be sequentially removed from the control resistors 49 and 48 in circuit with the pattern field winding 36 of the regulating generator 32 as the controller moves toward the "off" position. However, since the main motor 12 was operating with a relatively weak field, the current responsive relay 75 is in the deenergized position, and remains in this position until the energization of the main field winding 16 builds up. Accordingly, the control switch 72 will be in the energized position, shunting the control resistors 48 and 49 through contact member 72c, and maintaining a holding circuit for the "forward" relays 42 and 68 through contact members 68c, 72b and 43c. This causes the energization of the main field winding 25 of the main generator to be maintained at full strength, so as to keep the voltage output of the main generator at a relatively high value until the energization of the main field winding 16 of the main motor builds up to a predetermined percentage of the full field value. The greater part of the kinetic energy of the main motor 12 is, therefore, dissipated by regeneration at substantially full voltage. This gives the greatest value of regenerative kilowatts per ampere of armature current and, therefore, permits the armature current of the main motor to stay at a relatively low value during the regenerating period.

Further limitation of the armature current of the main motor during regeneration, is provided by the current limit generator 63, since this generator is arranged to energize the current limit field winding 17 of the main motor, and the current limit field winding 59 of the motor regulating generator 54 whenever the armature current exceeds a predetermined value, regardless of the direction of the armature current. Since the forward relays 42 and 68 remain energized until the current in the main field winding 16 builds up to approximately 80% of full field value, because of relay 72 providing a holding circuit through contact member 72b, the current limit generator 63 remains connected in the forward direction until this field condition is met. As the current in the armature 13 reverses during regeneration, the current limit generator acts to weaken the net motor field.

Since the current limit field winding 17 of the main motor 12 is connected more directly to the current limit generator 63, it responds with less time delay than the main field winding 16 which is connected through the regulating generator 54 and the control generator 50. Accordingly, for momentary increases in current in either direction, the current limit field winding 17 provides a substantially instantaneous, quick-response correction by increasing the net excitation of the motor field, and permitting the motor to develop a sufficiently greater torque per ampere of armature current, to thus reduce the armature current below the predetermined value, for a given value of torque.

As the field winding 17 of the main motor has relatively few turns as compared to the other field windings, its corrective effort must necessarily be limited. Should the increase of armature current of the main motor be of relatively small proportions this corrective effort may be sufficient to limit it, and the increase will thus be of short duration. For greater increases, the current limit generator 63 operating on the current limit field winding 59 changes the output of the regulating generator 54 to increase the output of the motor control generator 59, which results in increased energization of the main field winding 16. This requires a greater time than does the change effected in the energization of the field winding, 17, since the main field winding 16 receives its intelligence through two other machines and this delays its action to some extent. However, since the current limit generator 63 operates in this instance through the motor regulating generator 54, a much greater change in the field excitation of the main motor 12 may be produced in order to compensate for greater variations in its armature current.

As the voltage builds up in the reverse direction when the main motor 12 is reversed, the relay 80 will be in the inoperative position and contact members 80a are effective to shunt the control resistors 61 and 62. This prevents weakening of the motor field until the generator voltage reaches about 80%-90% of its normal value, and thereby limits the peak values of armature current caused by acceleration of the motor at weakened field conditions.

From the above description and accompanying drawing, it will be apparent that we have provided, in a simple and effective manner, for improving the operation of reversing motors. This improvement is highly important in connection with reversing hot mills of the two-high type which require that the mill motor be reversed for each reduction of the metal being rolled. Since the time necessary to make reversals and get the metal back into the mill is non-productive time, it is highly important to reduce this time. By using a single current limit type of generator, the motoring currents of the mill motor may be reduced by strengthening the field excitation. The use of a current responsive relay to hold the voltage of the main generator at its rated value until the motor field has been strengthened when reversing the motor from a relatively high speed in either direction, results in a great reduction in the regenerative peaks of the armature current.

Since certain changes may be made in the above-described construction and different embodiments of the invention may be made without departing from the spirit or scope thereof, it is intended that all the matter contained in the above description and shown in the accompanying drawing shall be considered as illustrative and not in a limiting sense.

We claim as our invention:

1. In a control system for a dynamoelectric machine having armature and field excitation systems, circuit means connected to energize the field excitation system in accordance with a predetermined pattern, and control means including a regulating generator with a saturable magnetic shunt connected to be operable only when the armature current increases above a predetermined value to vary the energization of the field excitation system to restore the armature current to said predetermined value.

2. A control system for a dynamoelectric machine having an armature and a plurality of field excitation windings comprising, circuit means including a regulating generator connected to effect energization of one of the field excitation windings normally in accordance with a predetermined pattern, and control means connected to be responsive to an increase of the armature current above a predetermined value connected to effect energization of the other of said field windings and to vary the pattern of energization of said one field excitation winding to restore the armature current to said predetermined value.

3. In a control system for a motor having armature and field excitation systems, circuit means connecting the armature circuit to a source of electrical energy, additional circuit means including a regulating generator connected for normally exciting the field excitation system according to a predetermined pattern, and control means including a control generator with a saturable magnetic shunt connected to be responsive to an increase of current in the armature circuit above a predetermined value operable to increase the excitation of the field excitation system.

4. An electric drive comprising, a motor having an armature and a plurality of field windings, circuit means connected to supply current to the armature, additional circuit means including a master controller and a regulating generator responsive to the operating position of the master controller connected to energize one of the field windings at a predetermined level, and control means including a regulating generator of the current limit type connected to be responsive to the armature current effective only when said armature current exceeds a predetermined value to energize another of said field windings.

5. In an electric drive, a motor having an armature and a field winding, circuit means supplying electrical energy to the armature, additional circuit means including a regulating generator having a saturable magnetic shunt connected to be normally operable to effect energization of the field winding according to a predetermined pattern, and control means including a current limit generator connected to be responsive to the armature current, said current limit generator being connected to increase the energization of the field winding above said pattern only when the armature current exceeds a predetermined value.

6. A drive for a rolling mill comprising, a motor having an armature and main and auxiliary field windings, circuit means including a regulating generator connected to be operable normally to energize the main field winding according to a predetermined pattern, additional circuit means connected to energize the armature, and control means including a control generator of the saturable magnetic shunt type responsive to increase of the armature current above a predetermined value connected to energize the auxiliary field winding and increase the energization of the main field winding above the predetermined pattern.

7. In an electrical drive, a motor having an armature and a field winding, circuit means including a main generator connected to energize the armature, additional circuit means including a regulating generator connected to effect energization of the field winding, control means operable to vary the output voltages of the main and regulating generators to vary the energization of the armature and field winding sequentially, and circuit means including relay means connected to be responsive to the energization of the field winding operable to prevent reduction of the main generator output voltage before the energization of the field winding reaches a predetermined level.

8. An electrical drive, for a reversing mill comprising, a reversible direct current motor having an armature and main and current limit field windings, a regulating generator connected to effect energization of the main field winding, said regulating generator having a pattern field winding and a current limit field winding, circuit means including a main generator connected to energize the armature and controlled by a regulating generator having a pattern field winding, a control generator of the current limit type connected to be responsive to the armature current of the motor only when it exceeds a predetermined value, and control means including a master switch operable to connect the current limit field windings of the motor and regulating generator to the current limit generator and the pattern field winding of the generator regulating generator to a source of electrical energy reversibly, said master switch being also operable to sequentially vary the energization of the motor and generator regulating generator pattern field windings of the motor and generator regulating generators.

9. A control system for a motor having an armature and a main field winding and an auxiliary current limit field winding, excitation means for the main field winding including a regulating generator having a pattern field winding connected in circuit relation with the main field winding, said regulating generator also having a current limit field winding, a variable voltage main generator connected to energize the armature of the motor, a regulating generator having a pattern field winding and an opposed control field winding energized in accordance with the generator output voltage for controlling the main generator, a current limit generator of the saturable magnetic shunt type, having excitation means connected so as to be responsive to the armature current of the motor only above a predetermined level, said current limit generator being connected to energize both of said current limit field windings only when said armature current increases above said predetermined level, and switch means so connected as to be operable to sequentially control the energization of the pattern field windings of the motor and generator regulating generators from a source of electrical energy.

EUGENE F. ALLBERT.
MARTIN H. FISHER.

REFERENCES CITED

The following references are of record in the file of this patent:

UNITED STATES PATENTS

| Number | Name | Date |
|---|---|---|
| 2,295,399 | Hanna | Sept. 8, 1942 |
| 2,300,988 | Stephenson | Nov. 3, 1942 |
| 2,322,637 | King et al. | June 22, 1943 |
| 2,347,037 | Edwards et al. | Apr. 18, 1944 |
| 2,383,971 | Ivy | Sept. 4, 1945 |
| 2,447,654 | Kenyon | Aug. 24, 1948 |